United States Patent
Dutta et al.

[11] Patent Number: 5,804,011
[45] Date of Patent: Sep. 8, 1998

[54] PROCESS OF MAKING A TWO-WAY STRETCHABLE FABRIC LAMINATE AND ARTICLES MADE FROM IT

[75] Inventors: Anit Dutta, Wilmington, Del.; Edward J. Daniel, Landenberg, Pa.; Robert C. Willmann, Port Deposit, Md.

[73] Assignee: W. L. Gore & Associates, Inc., Newark, Del.

[21] Appl. No.: 672,801

[22] Filed: Jun. 28, 1996

Related U.S. Application Data

[62] Division of Ser. No. 248,999, May 25, 1994, Pat. No. 5,529,830.

[51] Int. Cl.⁶ .................................................. B32B 31/00
[52] U.S. Cl. ...................... 156/160; 156/163; 156/229; 156/290; 156/291
[58] Field of Search .................................. 156/160, 163, 156/229, 290, 291

[56] References Cited

U.S. PATENT DOCUMENTS

| | | |
|---|---|---|
| 3,953,566 | 4/1976 | Gore . |
| 4,187,390 | 2/1980 | Gore . |
| 4,194,041 | 3/1980 | Gore et al. . |
| 4,230,838 | 10/1980 | Foy et al. . |
| 4,443,511 | 4/1984 | Worden et al. . |
| 4,493,870 | 1/1985 | Vrouenraets et al. . |
| 4,532,316 | 7/1985 | Henn . |
| 4,539,255 | 9/1985 | Sato et al. . |
| 4,692,369 | 9/1987 | Nomi . |
| 4,725,481 | 2/1988 | Ostapchenko . |
| 4,761,324 | 8/1988 | Rautenberg et al. . |
| 4,935,287 | 6/1990 | Johnson et al. . |
| 4,946,736 | 8/1990 | Sassa ......................................... 428/245 |
| 5,026,591 | 6/1991 | Henn et al. . |
| 5,036,551 | 8/1991 | Dailey et al. . |
| 5,209,969 | 5/1993 | Crowther . |
| 5,244,716 | 9/1993 | Thornton et al. . |
| 5,376,198 | 12/1994 | Fahrenkrug et al. .................... 156/164 |
| 5,529,830 | 6/1996 | Dutta et al. . |

FOREIGN PATENT DOCUMENTS

| | | |
|---|---|---|
| 039184 | 11/1981 | European Pat. Off. . |
| 313261 | 4/1989 | European Pat. Off. . |
| 415758 | 3/1991 | European Pat. Off. . |
| 541206 | 5/1993 | European Pat. Off. . |
| 2155853 | 10/1985 | United Kingdom . |
| 9321013 | 10/1993 | WIPO . |
| 95/32093 | 11/1995 | WIPO . |

*Primary Examiner*—Kathleen Choi
*Attorney, Agent, or Firm*—Gary A. Samuels

[57] ABSTRACT

The invention is a stretchable layered fabric laminate which is air impermeable and waterproof while being permeable to water vapor. The stretchable fabric laminate includes a stretchable composite material layer consisting of a hydrophobic protective layer of a porous polymeric material on each side of a layer of hydrophilic water-vapor-permeable synthetic polymer. The composite material layer is laminated to at least one layer of stretchable fabric. The stretchable layered fabric laminate has excellent stretch and recovery properties in both machine and transverse directions, and is useful for the manufacture of form-fitting articles of protective clothing and other end uses.

3 Claims, 6 Drawing Sheets

→ MACHINE DIRECTION

→ TRANSVERSE DIRECTION

PROCESS OF MAKING A TWO-WAY STRETCHABLE FABRIC LAMINATE AND ARTICLES MADE FROM IT

This application is a division of application Ser. No. 08/248,999, filed May 25, 1994, now U.S. Pat. No. 5,529,830.

FIELD OF THE INVENTION

This invention relates to stretchable fabric laminates which are air impermeable and waterproof while being permeable to water vapor, for use as form-fitting articles of protective clothing and other end uses.

BACKGROUND OF THE INVENTION

Protective clothing articles used for wear in wet conditions (such as rain, snow, etc.); in outdoor activities (such as skiing, biking, hiking, etc.); in handling hazardous chemicals, in preventing contamination, in avoiding infection, should in each instance protect the wearer by preventing leakage of water or other fluids and microorganisms into the article while keeping the wearer comfortable by allowing perspiration to evaporate from the wearer to the outside of the article. In addition, if such an article is intended to be reusable, it should maintain the functional attributes of protection and comfort during ordinary use including automatic machine washing.

In protective clothing articles where flexibility of movement is essential, stretchable fabric laminates with the above functional attributes are needed along with soft and drapeable feeling. Such stretchable fabric laminates are increasingly being used to make protective clothing articles which are form-fitting since the stretch properties of the material allow for a closer fit without adversely affecting the wearer's comfort. Gloves, mittens, socks, stockings, ski wear, running suits, athletic garments, medical compresses, are some examples of such articles of protective clothing requiring form-fitting characteristics.

In addition to the above, the direction or directions of stretch, the amount of stretch and its recovery and the force exerted during recovery are all important properties that determine comfort of form-fitting articles of protective clothing as well as the method and ease of manufacturing them. The precise magnitude and balance of these properties in a stretchable fabric material, however, depend on each specific end use.

A variety of laminated fabrics are known which offer stretch characteristics in addition to waterproofness and breathability as measured by their ability to pass water vapor. U.S. Pat. No. 4,935,287 (Johnson et.al.) describes stretchable laminate constructions based on an elastic fabric and a substantially non-elastic film which are held in intimate contact with one another by means of a noncontinuous pattern of adhesive. When the laminate constructions of the invention are in a relaxed state, the length of the film between adjacent adhesion points in the direction of stretch of the elastic fabric is essentially equivalent to the length of the elastic fabric between the same adhesion points when the construction is extended to its elastic recovery limit. A preferred embodiment of the invention utilizes waterproof breathable non-elastic membranes to produce laminate constructions suitable for clean room and protective garment applications. The breathable material of this invention provides stretch properties only in the machine direction.

U.S. Pat. No. 5,244,716 (Thornton et.al.) describes a composite extendable material useful for making a clothing article comprising a first film layer resistant to penetration by liquid water but permeable to water vapor. The first film layer is adhered at discrete securement locations to a second layer of water vapor permeable extendable sheet material. The adherence between the two layers is such that when the composite material is under no stretching force and resting on a flat surface the second layer is corrugated, ruched or puckered. The adherence is also such that the composite material can be stretched at least 10% in at least one direction by a force less than that required to stretch the material forming the first layer by the same amount by itself. The preferred material of this invention also relies on a single microporous film layer for breathability and waterproofness. Waterproofness of such microporous films are typically low and they are commonly susceptible to loss in the waterproofness due to contamination of the micropores by low surface tension liquids like oils, perspiration, etc. Also, such films are air permeable and are not absolute barriers because of their microporous nature.

U.S. Pat. No. 4,761,324 (Rautenberg et.al.) describes a laminated elastic fabric which includes a layer of stretch material having substantial elastic qualities, a polymer film layer being breathable, water-resistant and having elastic qualities, and an adhesive present in substantially discontinuous segments bonding the film to the elastic fabric. The material of this invention also relies on a single layer of polymer film for the properties of waterproofness and breathability. If such films are non-porous, they must be hydrophilic for adequate breathability. In that case, the hydrophilic nature of the film will cause them to swell and weaken significantly when in contact with liquid water. As a result, such polymer films usually show poor durability particularly when subjected to repeated automatic machine washing. U.S. Pat. No. 5,038,551 (Dailey et.al.) describes elastomeric composite fabrics which have a layered construction and are made of a microporous polymeric membrane, a water vapor permeable polymer, and an elastomeric thermoplastic nonwoven material. The elastomeric composite fabric provides barrier properties with water vapor permeability and finds utility in articles of wearing apparel and other articles which conform to the wearer. The material of this invention may not be suitable for certain end-uses since it uses an elastic non-woven material as a support which is relatively weaker than conventional woven or knitted fabrics. Also, the nonwoven material is bonded by using a continuous layer of a hydrophilic polyurethane which is susceptible to swelling and weakening in wet environments and is likely to contribute to poor durability in end-uses demanding repeated exposure to wet environments and automatic machine wash.

U.S. Pat. No. 4,443,511 (Worden et.al.) describes a waterproof and breathable elastomeric polytetrafluoroethylene layered article for use in, for example, material for protective articles. The waterproof and breathable polytetrafluoroethylene layered article can, for example, exhibit elastomeric properties of stretch to break of 275% in the machine direction and 145% in the transverse direction and a total stretch recovery of at least 39% after being stretched to 75% extension for 100 cycles. The invention further provides a waterproof and breathable polytetrafluoroethylene layered article bonded to a stretch fabric. The waterproof and breathable elastomeric polytetrafluoroethylene layered article bonded to a stretch fabric is thus durable and possesses a water vapor transmission rate exceeding 1000 gms./m$^2$ day, and preferably above about 2000 gms/m$^2$ day. The material of this invention may not possess adequate stretch recovery properties for certain end uses.

SUMMARY OF THE INVENTION

It is a purpose of the present invention to provide a soft, drapeable, stretchable fabric laminate with novel elastic properties in both machine and transverse directions at low stretching force while providing the functional attributes of breathability, waterproofness and air impermeability that are durably retained over the intended life of the form-fitting articles of protective clothing made from the laminate for a particular end use.

The purpose is accomplished herein by a stretchable layered fabric laminate stretchable in both the machine and transverse direction which comprises:

(a) a composite layer comprising two layers of porous hydrophobic material partially impregnated with and laminated together by a continuous layer of an elastomeric hydrophilic water-vapor permeable polymer to form said composite layer having a non-porous internal region and two porous surfaces;

(b) said composite layer being laminated on at least one side to a layer of an elastic fabric by an adhesive distributed in a non-continuous pattern such that the composite layer is bunched together in folds in the machine direction;

said fabric laminate, in both machine and transverse directions, being capable of stretching at least 10% and recovering at least 80% of the amount stretched when the stretching force is removed, and said fabric laminate being air and liquid water impermeable and is water vapor permeable to the extent of having a water vapor transmission rate of at least 2000 gm./m²/24 hrs.

The stretchable fabric laminate of this invention has novel stretch properties, and can be used to provide articles of protective clothing which are form-fitting with protection and comfort to the user. In addition, the novel stretch characteristics of the stretchable fabric laminate of this invention also provide the advantages of conventional stretch fabrics such as, better fit, more shape retention, improved ease of movement, better wrinkle resistance, fewer sizes and alterations, and more design flexibility.

Additionally, in one embodiment of the invention is provided a form-fitting article which comprises the stretchable fabric laminate defined above, said fabric laminate being joined together along the periphery thereof to form a configuration corresponding to the contour of a desired object, leaving at least one unjoined open portion. Thus, a form-fitting sock insert, sock, hose, stocking, sleeve, hat, glove insert, glove or mitten can be formed.

As used in this application:

By "waterproof" is meant the ability to resist penetration by liquid water by providing hydrostatic resistance of 6.8 kPa (1.0 psi) or more.

By "porous" is meant a structure of interconnected pores or voids such that continuous passages and pathways throughout a material are provided.

Machine direction as used herein indicates the direction of manufacture. Transverse direction as used herein indicates the direction in the plane of manufacture perpendicular to the machine direction. The materials of the layers described herein are considered to be planar, defined by their length (machine direction) and width (transverse direction).

Percentage stretch is defined as $$\% \text{ Stretch} = (Ls/Lo - 1) \times 100$$

and percentage recovery is defined as $$\% \text{ Recovery} = ([Ls-Lf]/[Ls-Lo]) \times 100$$

where $Lo$ is the original length, $Ls$ is the length when a stretching force is applied, and $Lf$ is the length when the stretching force is released.

DETAILED DESCRIPTION OF THE INVENTION

The present invention provides a stretchable fabric laminate formed of a composite layer bonded to at least one layer of an elastic fabric by a discontinuous pattern of an adhesive such that in its relaxed state the composite layer is bunched together in folds in the machine direction. The composite layer comprises two hydrophobic porous polymeric membrane layers partially impregnated and bonded together by a non-porous, continuous, water vapor permeable layer of an elastomeric hydrophilic polymer.

The stretchable fabric laminate of the present invention is capable of being easily stretched simultaneously in both the machine and the transverse direction and also exhibits excellent recovery from stretching in both directions, i.e., the fabric laminate has elastic properties in both directions. The porous polymeric membrane layers of the composite layer can be inherently non-elastic and may have virtually no recovery properties. Also, the porous polymeric membrane layers may have relatively poor stretch characteristics in one or both directions which must be overcome. Therefore, the elastic behavior of the stretchable fabric laminate results from the properties of the materials with which the porous polymeric membrane layers are combined or from the processing methods used to form the stretchable fabric laminate.

In either the machine or transverse direction the elastic properties can result from the material characteristics of the component layers. For example, from the presence of elastomeric yarns oriented generally in one or both directions of the knit or woven fabric forming the fabric layer, or from the hydrophilic elastomeric polymer forming the non-porous water-vapor-permeable layer of the composite layer which has generally isotropic elastic properties. To overcome limited stretchability or anisotropic stretchability of the polymeric membrane layers of the composite layer methods such as overfeeding, underfeeding, width control, and the like can be used in laminating the composite layer to the fabric layer. Such methods will be described in detail hereinbelow.

Figure 1:
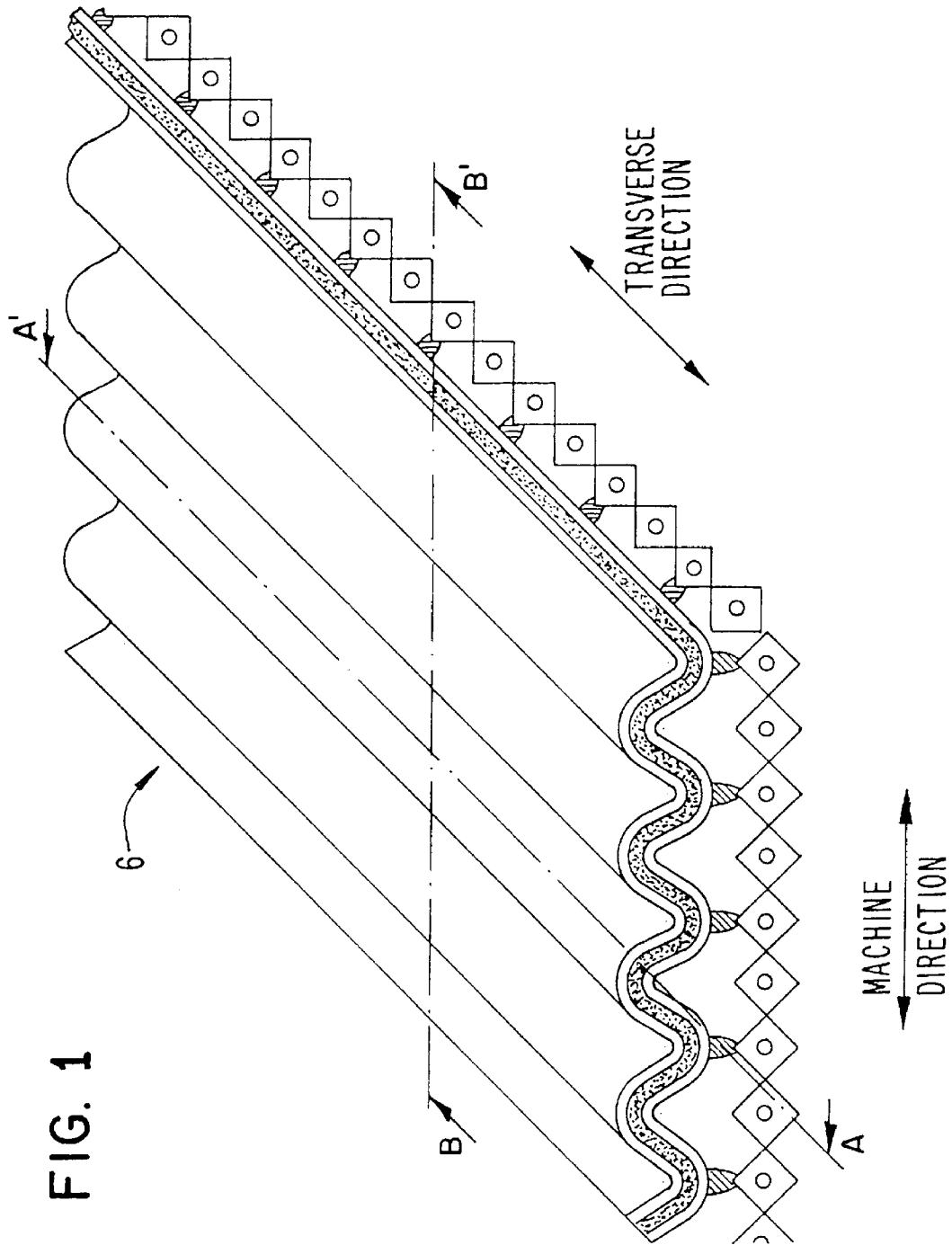
FIG. 1 is a perspective view of the invention.
Figure 3A:
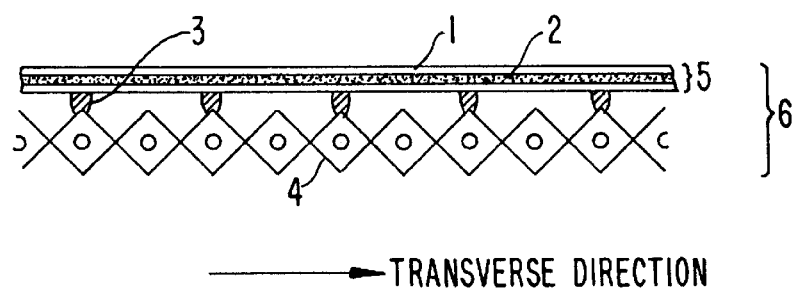
FIG. 3A is a schematic view of an unstretched laminate cross-section with one elastic fabric taken along line A-A' of FIG. 1.
Figure 3B:
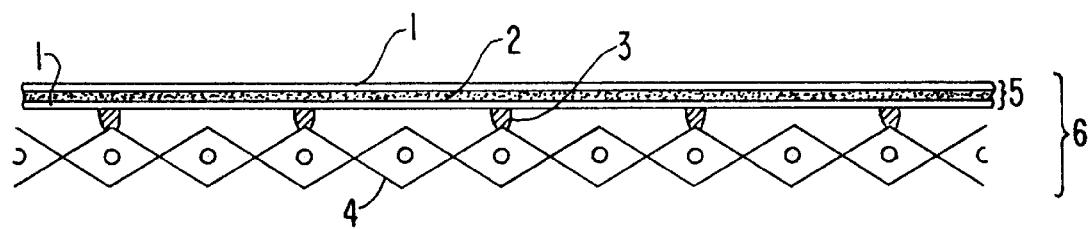
FIG. 3B is a schematic view of an unstretched laminate cross-section with one elastic fabric taken along line A-A' of FIG. 1.
Figure 4:
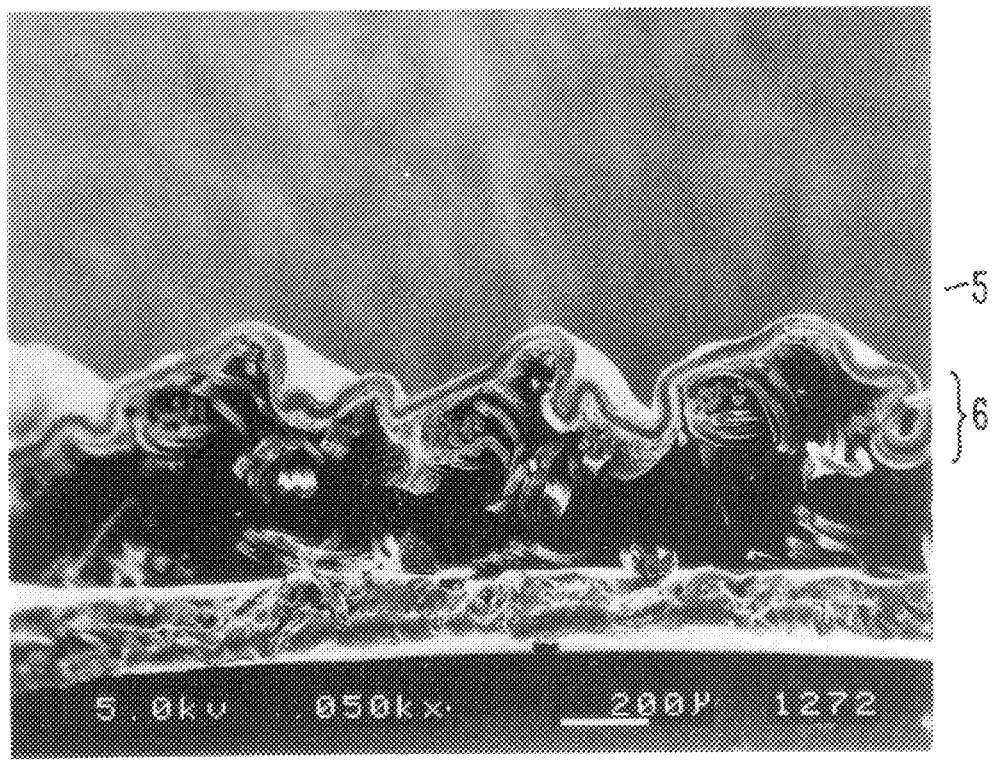
FIG. 4 is a photomicrograph of an unstretched laminate cross-section with one elastic fabric layer viewed in the machine direction. 50× magnification.
Figure 5:
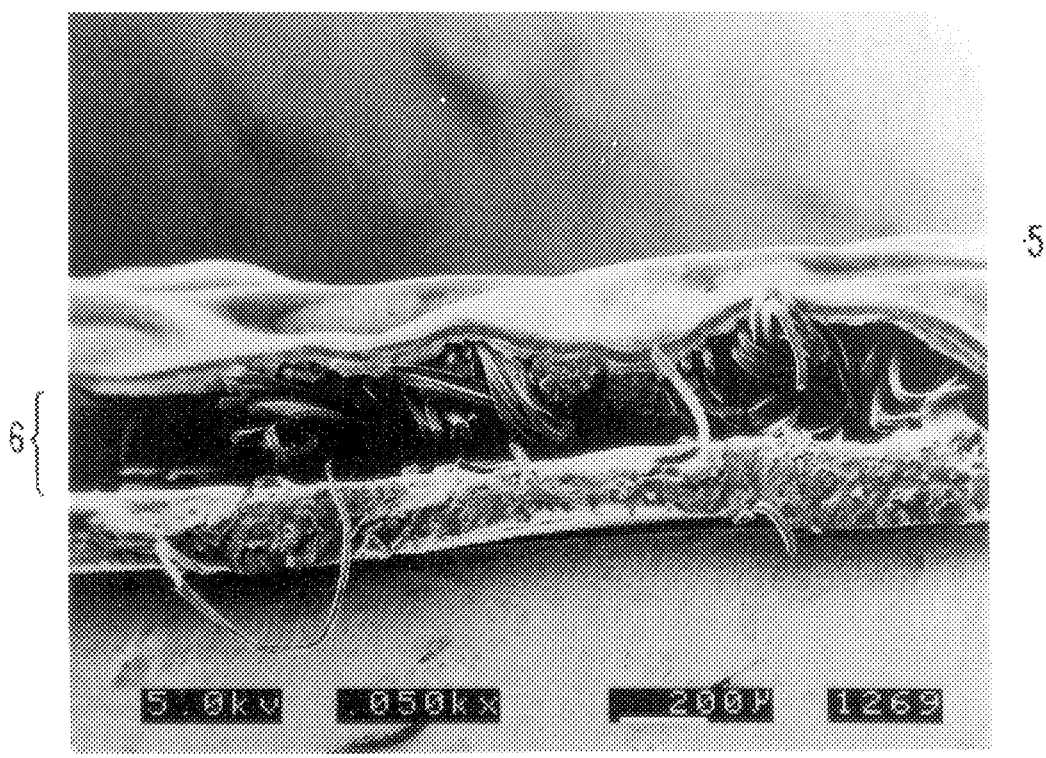
FIG. 5 is a photomicrograph of an unstretched laminate cross-section with one elastic fabric layer viewed in the transverse direction. 50× magnification.

The stretchable fabric laminate with one elastic fabric layer is shown schematically in FIGS. 1, 2 and 3, while FIGS. 4 and 5 are photomicrographs of the same. In FIGS. 1, 2, and 3, 1 is the porous hydrophobic polymer layer, 2 is the continuous non-porous hydrophilic water vapor permeable polymer layer, 3 is the discontinuously distributed adhesive, 4 is the elastic fabric, 5 is the composite layer comprising layers I and 2, and 6 represents the entire stretchable fabric laminate. As the schematics in FIGS. 1, 2 and 3 illustrate, the various layers are shown as individual layers; It is understood, however, that the moisture permeable polymer layer 2 penetrates partially into the pores of layers I to form the composite layer 5.

Figure 2A:
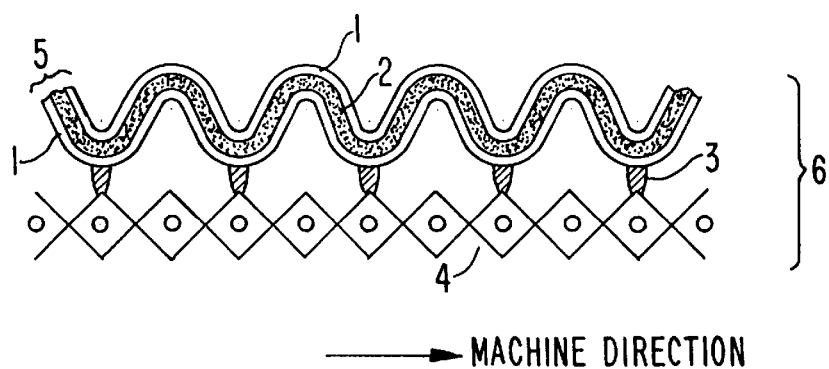
FIG. 2A is a schematic view of an unstretched laminate cross-section with one elastic fabric taken along line B-B' of FIG. 1.
Figure 2B:
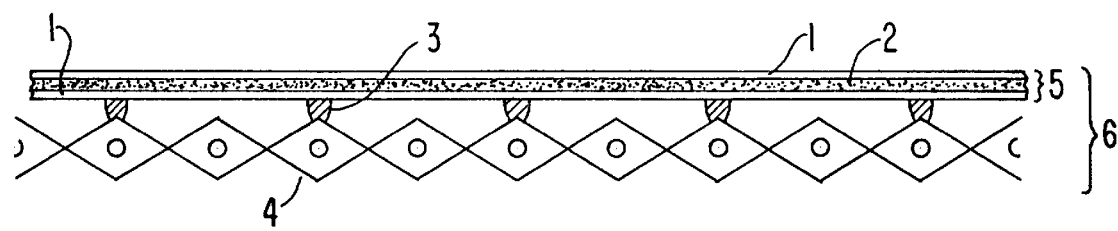
FIG. 2B is a schematic view of a stretched laminate cross-section with one elastic fabric taken along line B-B' of FIG. 1.

FIGS. 2A and FIG. 4 show the stretchable laminate cross-section parallel to the machine direction in an unstretched state. In this orientation, the composite layer 5 assumes a bunched, rippled or puckered appearance. As shown in FIG. 2B, the length of the layer 5 between adjacent adhesion points in the machine direction is substantially equivalent to the length of the elastic fabric 4 between the same adhesion points when the stretchable laminate 6 is extended to its elastic recovery limit. The discontinuous adhesive pattern 3 maintains the elastic fabric 4 in intimate contact with the composite layer 5 which is substantially inelastic in the machine direction.

FIGS. 3A and 5 illustrate the stretchable laminate cross-section parallel to the transverse direction in an unstretched state. In this orientation, the composite layer 5 is substantially planar and parallel to the elastic fabric layer 4. As shown in FIG. 3B, under a stretching load in the transverse direction, the laminate 8 stretches in the transverse direction due to stretching of both the composite layer 5 and the elastic fabric 4 by the same amount between the adjacent adhesive junction points. The discontinuous adhesive pattern 3 maintains the elastic fabric 4 in intimate contact with the composite layer 5 which has elastic properties in the transverse direction.

The stretchable fabric laminate of the invention can also be made with two layers of elastic fabric, each layer being adhesively bonded to the porous surface of the composite layer 5. The essential features of the laminate geometry remains unchanged with the composite layer being bunched or corrugated in the machine direction and being substantially planar in the transverse direction. The laminate, however, appears substantially planar since the bunching or wrinkling of the composite layer 5 is now covered by the presence of another elastic fabric layer.

By proper selection of the materials and assembly techniques, the stretchable fabric laminate of this invention yields several worthwhile and surprising results.

Unlike many stretchable fabric laminates, the laminate of this invention is capable of stretching simultaneously in both the machine and the transverse direction. In particular, the laminates of the present invention are capable of stretching by at least 10%, preferably by at least 25%, and most preferably by at least 40%, of its original length in both the machine and transverse directions. In addition to the capability to stretch under a load, the laminate should also recover, in both directions, most of its original length when the stretching force is released. The laminates of this invention are capable of recovering at least 50%, preferably 65%, and most preferably at least 80% of the stretched amount. Such multi-directional stretch and recovery properties are of great significance in applications of these laminates as articles of protective clothing. In particular, the ability to stretch the laminate in both the machine and the transverse direction and the ability to recover the stretched amount allow for improved form-fitting characteristics of the three dimensional article made from the two dimensional laminate. In addition, the multi-directional stretch characteristics allow for other benefits like fewer size requirements, more design flexibility and easier assembly. In articles such as gloves or socks, easy donning and doffing are possible only if the fabric material constituting it possesses adequate multi-directional stretch properties. In the absence of such multi-directional stretch properties, such articles need to be assembled from various pieces, each oriented to provide the needed stretch characteristics in different directions.

Also of great utility is the fact that the stretchable fabric laminate of this invention can stretch in both the machine and the transverse direction by application of a low amount of stretching load. This is defined by the stretching force which is the force required per unit width to elongate the laminate by a fixed amount in a particular direction. For example, 10% stretching force is the force per unit width required to stretch the laminate by 10% of its original length. The stretching force is an indication of the ease with which the laminate can be stretched. The laminates of this invention demonstrate a 10% stretching force less than 0.15 kg/cm (0.85 pli) width, as measured by the test described herein. Similarly tested, the 50% stretching force of the laminates range from 0.08–0.60 kg/cm (0.45–3.41 pli) depending on the direction of stretching. Due to the low stretching force required, the laminate of this invention demonstrates particularly soft and drapeable behavior that is desirable in fabric materials used for form-fitting articles of protective clothing.

It is worthwhile to note that in considering the physical properties of this stretchable laminate such as softness and flexibility, and its stretchable characteristics, it appears that the freedom of movement is inherent in the entire laminate and not explained strictly by the built in geometry by which it is assembled nor strictly explained by any one of the materials of construction. For example, it is to be expected that the force required to stretch the laminate of this invention in the machine direction is substantially lower than the sum of the forces required to stretch the material of the composite layer and the elastic fabric layer (or layers) individually by the same amount in the machine direction. However, depending on the particular construction of the elastic fabric used, this is also true for the laminate stretched in the transverse direction, and this is unexpected.

Having a continuous water-vapor permeable but liquid water impermeable polymer layer, the stretchable laminate provides a barrier to various sources of contamination by particulates, microorganisms or low surface tension liquids. This provides superior contamination protection than material that relies on filtration phenomena to keep out (or in) contaminants. The continuity of this layer can be demonstrated by the fact that the stretchable laminate has substantially no air permeability. This property is imparted to the laminate by the continuity of the hydrophilic polymer layer, because the porous hydrophobic polymer layers and the elastic fabric exhibit air flow by their nature.

The stretchable laminate of this invention shows excellent hydrostatic resistance as determined using the Mullen Burst Test described hereinbelow. The laminate has an average burst strength of at least about 50 psi, preferably of at least about 100 psi, and most preferably of at least about 150 psi.

The stretchable laminate of this invention also has the beneficial functional characteristics of being water-vapor permeable. The laminate has a WVTR (Water vapor transmission rate) of at least 2000 g/m$^2$/24 hrs, preferably greater than 4000 g/m$^2$/24 hrs, and most preferably greater than 6000 g/m$^2$/24 hrs, as measured by the test described herein.

The stretchable laminate of this invention also provides superior wash durability due to the novel construction of the composite layer that provides the functional barrier properties of windproofness, waterproofness and breathability. Owing to the construction of the composite layer, the non-porous continuous water vapor permeable hydrophilic polymer layer is protected by a hydrophobic porous layer on each side. As a result, even in a wet environment as in actual end-use or in automatic machine wash; the hydrophilic polymer layer does not come in direct contact with liquid water which will swell the polymer excessively and weaken it. The weakened continuous polymer film would then be susceptible to failure due to generation of a variety of defects created by abrasion and deformation.

Additional characteristics of this stretchable laminate are best understood when the laminate is converted into articles of protective clothing, for example, socks, gloves, sleeves, and braces. Typically, such articles can be formed by placing two layers of the laminate of the invention on top of another with the porous layers of each layer in contact with one another and sealing them together in the desired position to create a waterproof seam. Sealing can be done by the use of conventional techniques like heat sealing, RF sealing, ultrasonic sealing, electromagnetic welding and other methods known in the art. If the porous polymer layers are not amenable to such sealing or if the laminate comprises of two elastic fabric layers, articles can be formed by other methods known in the art.

One method for manufacturing an article in the form of a sock with the stretchable laminate of this invention is as follows. Two layers of the stretchable laminate are positioned such that similar elastic fabric layers are adjacent to one another. These sheets of material are then cut into the shape of a sock using appropriate dies known in the art. The stitching of the two sheets is then conducted along the periphery that defines the contour of a foot, leaving the ankle portion unstitched. The stitched seam is then sealed with a water impermeable adhesive tape to make the entire sock waterproof. What is obtained is a substantially two-dimensional stretchable sock into which the foot may be inserted via the open ankle portion. Due to the features of the stretchable laminate herein, and if the die pattern has been appropriately designed and sized, the sock conforms to the individual's foot as it is pulled on yielding a three-dimensional form fitting sock. The sock exerts a gentle force on the foot to provide a snug comfortable fit. As such, the socks of these materials also are liquid water tight and are substantially air impermeable. This means there is exceptionally high contamination protection provided by the socks made from the stretchable laminate. Furthermore, the microclimate around the wearer's foot is maintained comfortable by the high moisture vapor permeability of the stretchable laminate.

Another method for manufacturing an article in the form of a glove with the stretchable laminates of this invention is as follows. On a layer of the stretchable laminate, a molten bead of a hot melt adhesive is deposited in the shape of the hand which is then brought in contact with another fabric layer, which may or may not be stretchable. The entire assembly is then heat sealed and trimmed to obtain the final article. The heat sealing creates a seam along the periphery that defines the contour of a hand, leaving the wrist portion unsealed. Trimming is accomplished outside this heat sealed bond line and in addition includes the wrist portion. What is obtained is a two-dimensional stretchable glove into which the hand may be inserted via the open wrist portion. Due to the multi-directional stretch characteristics of the laminates herein, and if the die pattern has been appropriately designed and sized, the glove conforms to the individual's hand as it is pulled on, yielding a three-dimensional form-fitting glove. Further, since the glove is constructed from the soft and drapeable stretchable laminate described herein, it allows for good dexterity on behalf of the user. Furthermore, the gloves are comfortable to the user. The fact that an individual can have a fabric surface against the hand is also an added benefit provided by the laminate of this invention.

Because articles of the stretchable laminate herein exhibit exceptional contamination control, are very functional (i.e. form fitting with good touch and feel characteristics) and comfortable, they are particularly useful as articles of protective clothing, providing protection from influences such as outdoor weather, from contamination in clean room environments, from infection in medical use, from hazardous liquids in chemical handling. Additionally, since the articles made from the laminate of this invention provide a certain amount of compressive force while fitting a form snugly; the laminates of this invention can also be used in the management of wound care in various forms such as burn mittens, burn compresses, and the like. The compressive force exerted by an article made from the stretchable laminate of the invention can also be useful in health-care applications in the form of sleeves, braces, and liners for orthopaedic casts.

The porous polymeric membrane used in this invention is a microporous polymer having a microscopic structure of open, interconnecting micro voids. It exhibits air permeability and as such imparts, or does not impair, water vapor permeability. The microporous membrane in the laminate described herein is typically of a thickness of 5 $\mu$m to 125 $\mu$m, most preferably of the order of about 5 $\mu$m to 25 $\mu$m.

The microporous polymeric membrane can be inelastic in nature, but the essential requirement of the membrane is that it is able to elongate at least 50%, more preferably at least 100%, and most preferably at least 150% in the transverse direction while retaining its liquid water impermeability. Such elongation properties in the machine direction of the microporous polymeric membrane are not essential to make the stretchable laminate of this invention.

Furthermore, the microporous polymeric membranes useful herein are soft and flexible, either by virtue of their geometry or their chemistry or both. The useful polymers of the microporous membrane materials include plastic polymers as well as elastomeric polymers. Examples of suitable polymers include polyesters, polyamides, polyolefins, polyketones, polysulfones, polycarbonates, fluoropolymers, polyacrylates, polyurethanes, copolyether esters, copolyether amides and the like. The preferred polymers are plastic polymers.

The preferred microporous polymeric membrane material is expanded, microporous polytetrafluoroethylene (PTFE). These materials are characterized by a multiplicity of open, interconnecting microscopic voids, high void volume, high strength, soft, flexible, stable chemical properties, high water vapor transfer, and a surface that exhibits good contamination control characteristics. U.S. Pat. No. 3,953,566 and 4,187,390 describe the preparation of such microporous expanded polytetrafluoroethylene membranes and are incorporated herein by reference.

It has been found that the stretch characteristics of the laminate herein can be controlled to a large degree by selecting the microporous expanded PTFE with a specific combination of properties such as weight per unit area, and the level of anisotropy in elongation characteristics. For the laminate of this invention, microporous expanded PTFE membranes with weights of 2 to 50 gm/m$^2$ may be useful, but the range of 2 to 30 gm/m$^2$ is preferred. Moreover, if the polymeric membrane does not inherently possess the necessary elongation characteristics in the transverse direction, it is possible in some cases to develop this property in the membrane. For example, by stretching the membrane in the machine direction its width can be reduced without any substantial change in thickness. The membrane, so processed, can then be stretched transversely back to about its original width without difficulty. If the membrane is used to form a composite layer while the membrane width has been thus reduced, and the composite layer subsequently laminated to a fabric having elastic stretch properties in the transverse direction, suitable elastic properties in the transverse direction can be obtained in the laminate. Membranes having isotropic elongation characteristics can be prepared as described above, but isotropic behavior is not necessary to make the laminate of this invention.

The continuous water vapor permeable polymer layer is a hydrophilic polymer having some elastomeric characteristics. The hydrophilic layer selectively transports water by diffusion, but does not support pressure driven liquid or air flow. Therefore, moisture i.e. water vapor, is transported but the continuous layer of the polymer precludes the passage of such things as airborne particles, microorganisms, oils, or other contaminants. This characteristic imparts to the elastomeric composite fabric, and in turn to articles made from it, such as socks and gloves, good contamination control characteristics by functioning as a barrier to contaminants of all sizes. Furthermore, the water vapor transmitting characteristics of the material allow for comfort characteristics to the wearer.

The continuous water-vapor-permeable polymer layer is typically of a thickness of between 5 μm to 50 μm, preferably between about 10 μm and 25 μm. This thickness has been found to be a good practical balance to yield satisfactory durability, continuity, and rate of water vapor transmission.

Although not limited to them, the continuous, water-vapor-permeable polymers most useful herein are those of the polyurethane family, the copolyetherester family, or the copolyetherester amide family. Suitable copolyether ester hydrophilic compositions may be found in the teachings of U.S. Pat. No. 4,493,870 to Vrouenraets and U.S. Pat. No. 4,725,481 to Ostapachenko. Suitable hydrophilic copolyetherester amide compositions are described in U.S. Pat. No. 4,230,838 to Foy et.al. Suitable polyurethanes may be found by way of example in the teachings of U.S. Pat. No. 4,194,041 to Gore. A preferred class of continuous, water vapor permeable polymers are polyurethanes, especially those containing oxyethylene units, such as are described in U.S. Pat. No. 4,532,316 to Henn, incorporated herein by reference. Typically these materials comprise a composition having a high concentration of oxyethylene units to impart hydrophilicity to the polymer, The concentration of oxyethylene units is typically greater than 45% by weight of the base polymer, preferably greater than 80%, most preferably greater than 70%.

Because the continuous water vapor permeable layer is not directly exposed, but is protected by the porous hydrophobic membrane layer, in the stretchable composite fabric of this invention, the hydrophilicity does not need to be compromised as it has in many prior art fabrics. Preferably materials are selected so that the water vapor permeability of each is at its maximum. As such the continuous permeable polymer layer can frequently be found to be the limiting link in the water vapor permeability of the fabric. Part of the inventiveness herein is the ability to be able to maximize the water vapor permeability without tradeoffs to the final stretchable laminate's contamination control and stretch properties.

Figure 6:
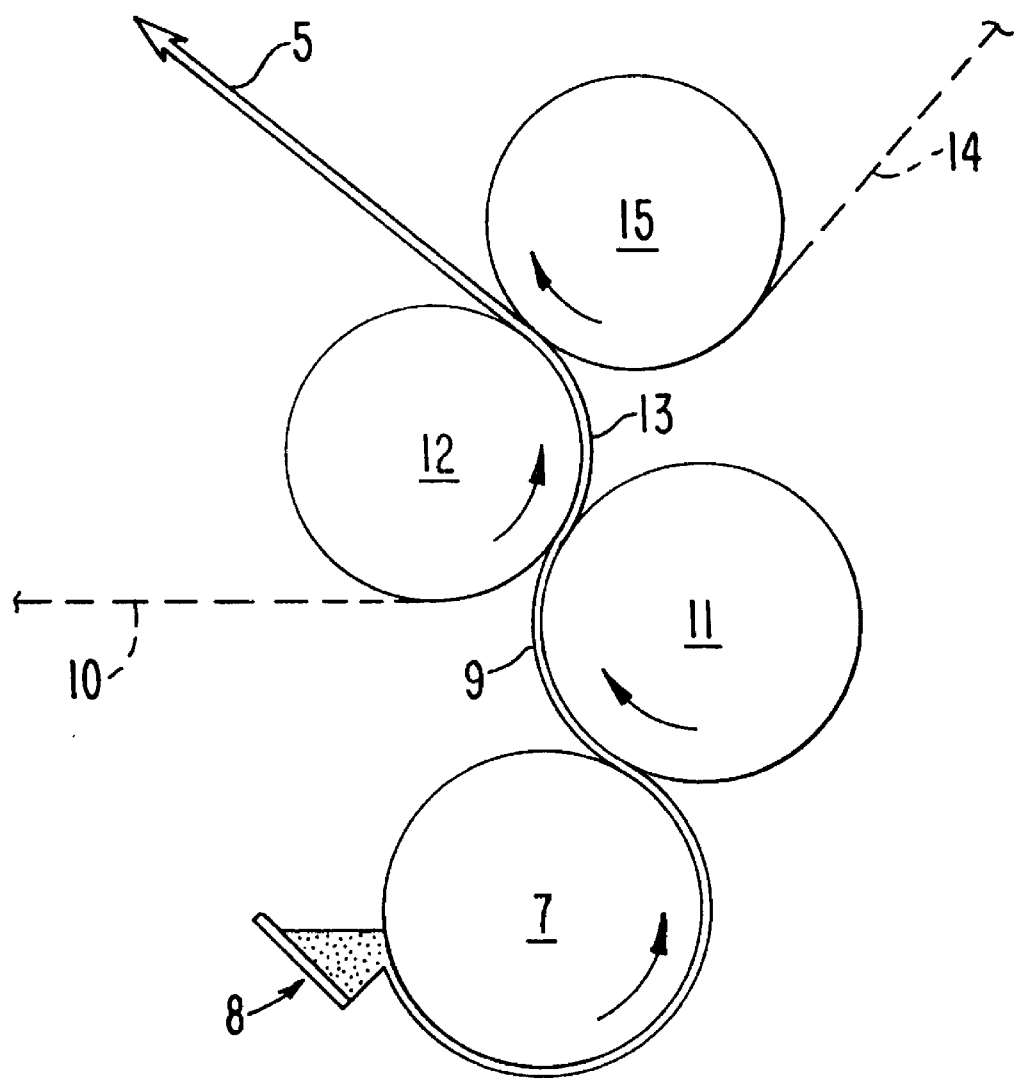
FIG. 6 depicts a procedure used to make the composite layer.

The composite layer 5 used to make the stretchable laminate of this invention can be prepared according to the teachings of U.S. Pat. No. 5,026,591 to Henn et.al, incorporated herein by reference. The method is illustrated but not limited to the following description of a four roll stack as shown in FIG. 6. Metered control of the molten water vapor permeable polymer is provided for by a gravure roll 7 and doctor blade/polymer reservoir 8. The water vapor permeable polymer 9 is applied as a thin, continuous, liquid film to the continuously moving porous polymeric membrane 10 in the nip between two rotating rolls 11, 12; one such rotating roll 11 having been coated with the liquid polymer and the other such roll 12 providing support so as to force the polymer partially into the porous structure of the membrane 10. The composite 13 is subsequently combined with another porous polymer layer 14 in the nip between two rotating rolls 12, 15, resulting in the composite layer 5 used in this invention.

A wide variety of elastic fabrics 4 can be utilized in the stretchable laminate of this invention; however, such elastic fabrics should not make the final stretchable laminate so stiff so as to offer excessive resistance to body movements or to reduce its form-fitting characteristics.

The elastic fabric should be able to stretch easily in both the machine and the transverse direction. It is, however, not necessary that these fabrics have similar elastic properties in both the directions. It has been determined that the elastic fabric should be capable of stretching at least 10%, more preferably at least 50%, and most preferably at least 100% in both directions.

Elastic fabrics usable in the stretchable laminate constructions of the present invention include woven, non-woven or knitted fabrics. The elastic fabrics are typically composed of a hard or non-elastomeric fiber and an elastic fiber. Suitable hard fibers include synthetic fibers such as nylon, polyester or polypropylene fibers or naturally occurring fibers such as cotton. Suitable elastic fibers include polyurethane block copolymer based fibers as described in U.S. Pat. No. 2,692,873 and sold as Lycra™ or Spandex fibers.

Knitted fabrics are preferred as the elastic fabrics used in the stretchable laminate of the present invention. Such elastic knitted fabrics are typically composed of a hard fiber yam that is non-elastomeric and an elastomeric Lycra™ or Spandex yarn. The knit has elastic characteristics by virtue of the structure of the knit and its elastomeric fiber content. More specifically, knitted fabrics having 5 to 20% elastomeric fiber content and from 95 to 80% hard fibers have been found to be very useful. Warshow Style 3320 knitted fabric having 80% of nylon 6,6 fiber and 20% of Lycra™ fiber with a machine direction/transverse direction elongation of 414%×219% is a typical example of an elastic fabric suitable for the stretchable laminates of this invention.

The technique for laminating the composite layer 5 to an elastic fabric 4 is of great importance to the resultant stretch characteristics of the stretchable laminate 6. A wide range of adhesives can be used to bond the composite layer to a layer of an elastic fabric.

The adhesive can be applied to either component to be bonded in the form of powder, hot melt, reactive hot melt, solution or dispersions, or discontinuous net-like sheet.

The adhesive can be of any type, e.g. one forming a bond by solvent evaporation or by coalescence from a dispersion, with or without exposure to heat, or one functioning by a thermoplastic (e.g. hot melt) mechanism, but is preferably of a type which is crosslinkable, or curable, usually upon activation by heat; the cross-linkable nature being an advantage from the standpoint of enhanced resistance to exposure to heat and prolonged contact with water, e.g. on washing.

Crosslinkable polyurethane adhesives are known to give satisfactory results. Such adhesives are commercially available in various forms; as an aqueous dispersion, as a solution in organic solvents, as a powder or solid chip to be used as a hot melt composition or be first dissolved in organic solvents, or as a discontinuous net-like sheet or non-woven web.

Adhesives in form of an aqueous dispersion or an organic solvent solution, e.g. polyurethane prepolymers, are frequently hydroxyl- or hydroxyl- and carboxyl-terminated and are blended with a crosslinking agent shortly prior to use. The crosslinking agent may be e.g. aziridine (ethylene imine), a substituted aziridine, a polyfunctional isocyanate prepolymer, a melamine- or urea-formaldehyde resin, or an epoxy composition.

Adhesives in the form of powder or sheet are frequently supplied already compounded with the crosslinking agent but have adequate stability at ambient temperature.

The blended adhesive is typically applied to one or both layers to be bonded at a dry weight of 5 to 50 grams per square meter. The method of application depends on the form in which the adhesive is used and can be e.g., sprinkling for a powder, but spraying or gravure printing are preferred for a liquid, hot melt or reactive hot melt adhesive.

Regardless of the adhesive system, it is important that the adhesive provides high green strength and that it is capable of resisting wet environments.

A preferred adhesive system is a carbamate/urethane composition as described in U.S. Pat. No. 5,209,969 to Crowther, incorporated herein by reference. This is a storage stable adhesive mixture of hexamethylenediamine carbamate and the reaction product of ethylene/propylene oxide polyol and a polyurethane prepolymer of diphenylmethane diisocyanate, polytetramethylene glycol, and optionally, 1,4-butanediol. Under ambient conditions, the adhesive is a viscous liquid of about 2000 poise viscosity which becomes a liquid of about 300 poise viscosity when heated to 50° C. The adhesive typically requires a cure time of several minutes at 140° C., but the cure time can be significantly reduced by increasing the cure temperature to greater than 160° C.

It is important that the a minimal amount of adhesive 3 be used in bonding the composite layer 5 to the elastic fabric 4. Adhesive can be applied to the composite layer or the elastic fabric such that it covers less than about 70%, more preferably less than about 50% and most preferably less than about 40% of the surface of the composite layer on the fabric. It is preferred that the adhesive be applied to the composite layer. The adhesive add-on weights can range from 5 $gm/m^2$ to 50 $gm/m^2$, with the preferred add-on weights ranging from 5 $gm/m^2$ to 30 $gm/m^2$. The adhesive coverage can be adjusted over the indicated range to provide a stretchable laminate with specific performance requirements for a given application.

The adhesive can be applied using a variety of contact and non-contact techniques. Gravure printing and screen printing are typical contact techniques; whereas spraying and melt blowing are examples of non-contact techniques for adhesives that are applied in form of a liquid. In cases of adhesive in the form of a web, such application techniques are not needed since the adhesive already has been preformed in the form of a continuous porous web with built in discrete openings in the plane of the web.

Figure 7:
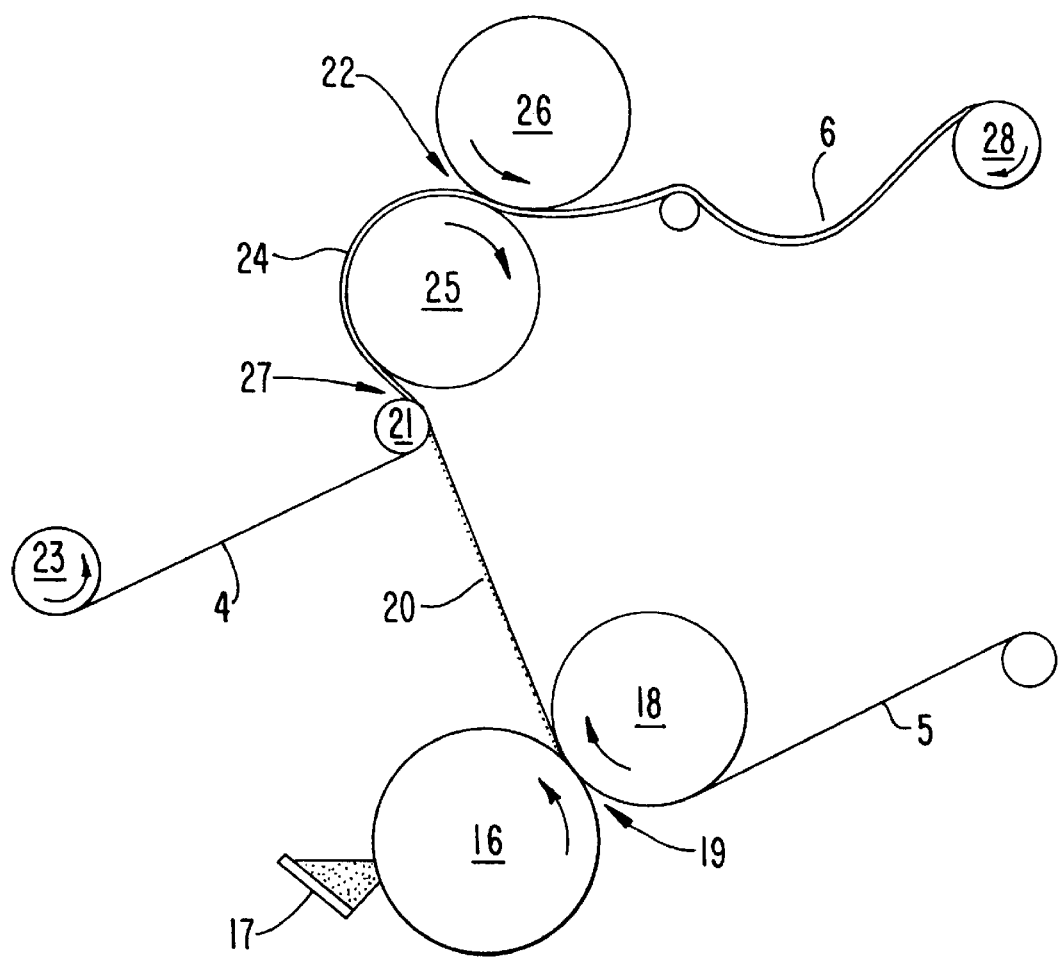
FIG. 7 depicts a lamination procedure used to make stretchable fabric laminates of the invention.

The process used to prepare the stretchable laminate of this invention can be better understood with reference to FIG. 7 which is a schematic illustration of a preferred process.

In the process, a dot pattern of heat-curing adhesive is metered onto one of the porous surfaces of the composite layer 5 by a gravure roll 16 in such a manner as to provide coverage of approximately 33% of the porous surface. The doctor knife/adhesive reservoir 17 and the gravure roll 16 are heated to about 50° C. The composite layer is held under minimal tension against the gravure roll by a low durometer rubber roll 18 at a pressure sufficient to effect removal of the adhesive dots onto the porous surface of the composite layer 5.

On exiting the printing nip 19 the adhesive dot coated composite layer 20 is brought to the laminating roll 21 where it is brought in intimate contact with the elastic fabric 4 being held in a stretched state by ensuring that the speed of the exit nip 22 is higher than that of the feed roll 23. Control of the stretch of the elastic fabric 4 at this stage of the process is critical as the stretch properties of the final laminate in the machine direction will depend on it. Typically the fabric is stretched in the machine direction such that its width is reduced to about 50% to 90% of its initial width. If the elongation of the elastic fabric is too low, the stretch properties of the resulting laminate will be low and the stretching force will be high in the machine direction. Excessive elongation of the elastic fabric, however, must be avoided since this may lead to inelastic deformation of the fabric in the machine direction.

The laminate 24 created by the uncured adhesive is then wrapped around a roll 25 and heated to a temperature suitable for curing the adhesive. During this curing stage, the laminate is held under tension against the heated roll 25 and the curing time is controlled by the degree of wrap around this roll as well as the speed at the exit nip 22. The exit nip is formed by a rubber roll 26 exerting pressure against the heated roll 25 while being maintained at ambient temperature. During this curing stage, it is preferred that the composite layer of the laminate 24 is in contact with the hot roll and that the tension of the laminate between the roll 21 and nip 22 is the same as that of the elastic fabric between the feed roll 23 and the nip 27.

Upon exiting nip 22, the final laminate 6 is immediately allowed to relax by taking it up on a roll 28 while maintaining the laminate under no tension. Allowing the laminate to cool in a relaxed state is critical in maintaining the machine direction stretch properties of the laminate of this invention. If the laminate is taken up under tension, the stretch properties of the laminate are adversely affected due to deterioration of the stretch characteristics of the elastic fabric.

A stretchable laminate with two elastic fabric layers can also be made by laminating an elastic fabric layer to the porous surface of the stretchable laminate 6 using the preferred lamination process described above. In this case, the adhesive is printed in a dot pattern on the porous side of the stretchable laminate 6 and is laminated to the second elastic fabric using the same procedure described above. Prior to printing of the adhesive, the stretchable laminate 6 should be stretched such that the porous surface becomes substantially flat. Alternatively, it is also possible to use a moisture curing adhesive such as a polyurethane adhesive described in U.S. Pat. No. 4,532,318 to Henn. In this case, the heated roll 25 can be maintained at a lower temperature such that the final laminate can be taken up under high tension to hold the laminate in a stretched state while the adhesive is allowed to cure by slowly reacting with ambient moisture.

In addition to the preferred process, the stretchable laminate can also be produced by different techniques depending on the form and nature of the adhesive used. It is key, however, that the adhesive ;s capable of bonding the composite layer to the stretched elastic fabric such that the adhesive junctions are not disturbed when the laminate is returned to the relaxed state. This can be achieved in different ways. The preferred process uses thermal activation of the adhesive. Alternatively, cooling of a thermoplastic adhesive may be used to create such adhesive junctions. Another alternative is to use a high green strength thermosetting adhesive to create such adhesive junctions which are then subsequently reacted for added adhesive strength. U.S. Pat. No. 4,820,368 to Markera et.al. describes a class of such high green strength reactive hot melt adhesives.

TEST PROCEDURES

A variety of different tests have been used in the examples to demonstrate the various functional characteristics of the fabric laminates.

GURLEY NUMBER DETERMINATION

The microporous membrane and the composite layer were tested for air permeability. The results are reported as Gurley Numbers, defined herein as the time in seconds for 100 cc of air to flow through 6.45 cm$^2$ of test material under a pressure drop of 1.2 kPa. The test device, a Gurley Densometer Model 4110, was employed in a method similar to Method A of ASTM D726-58. The sample was clamped into the testing device with a reinforcing mesh screen (150 microns) under the test sample to prevent rupture of the test sample. Three test samples were employed. If no air flow was detected for 5 minutes, the sample is considered to be air impermeable.

MOISTURE VAPOR TRANSMISSION TEST

A description of the test employed to measure water vapor transmission rate (WVTR) is given below. The procedure has been found to be suitable for testing fabric laminates with high transmission rates.

In this procedure, approximately 70 mls of a saturated salt solution of potassium acetate and distilled water was placed into a 133 mls polypropylene cup, having an inside diameter of 6.5 cm at the mouth. An expanded PTFE membrane, having a Gurley number of about 7 seconds, a bubble point of about 179 kPa, thickness of about 37 microns and a weight of about 20 gms/m$^2$, available from W. L. Gore & Associates of Newark, Del., was heat sealed to the lip of the cup to create a taut, leakproof, microporous barrier containing the salt solution. A similar expanded PTFE membrane was mounted taut on the surface of a water bath while ensuring that the membrane is in contact with the water in the bath. The water bath assembly was controlled at 23° C., plus or minus 0.2° C., utilizing a temperature controlled room and a water circulating bath.

The area for testing WVTR was 7.5 cm diameter and the sample was equilibrated in a chamber having a relative humidity of about 50 percent for a minimum of 4 hours. The sample was then placed on the surface of the expanded PTFE membrane covering the water bath.

The cup assembly was weighed to the nearest 1/1000 gm and was placed in an inverted manner onto the center of the test sample.

Water transport was provided by the driving force between the water and the saturated salt solution providing water flux by diffusion in that direction. The sample was tested for 15 minutes and the cup assembly was then removed, weighed again to within 1/1000 gm.

The WVTR of the sample was calculated from the weight gain of the cup assembly and was expressed in grams of water per square meter of sample surface area per 24 hours.

MULLEN BURST TEST

The stretchable fabric laminates were evaluated for waterproofness by the Mullen Burst Test (Federal Standard 191, Method 5512). This test involves applying a hydrostatic force to the material under test and is used to determine the burst pressure of the laminate, or the pressure at which the laminate of the invention begins to leak.

Laminates having a single layer of elastic fabric were mounted in the test apparatus with the elastic fabric on the low pressure side and the composite layer facing the high pressure side. In the case of laminates with two elastic fabric layers, the side with the lighter weight fabric faced the high pressure side. A woven taffeta fabric was used on top of the sample (low pressure side) to prevent excessive stretching of the sample.

TENSILE PROPERTIES

The tensile properties of the materials were determined using ASTM D882-83 Method A. A constant rate-of-jaw separation type machine (Instron testing machine) was used to perform these tests.

Materials were cut using a die into appropriate sizes (1"×at least 3" for porous membranes and composite layer samples, 1"×3" for laminate samples) in both the machine and the transverse direction. Samples were allowed to condition in a controlled room at a temperature of 21° C. and 65% relative humidity.

The gauge length of the test was 1 inch and the strain rate employed was 10 inches/min. All samples were tested till break.

Force and strain were recorded until the sample broke. The maximum force, the strain at break and the forces at 10%, 25% and 50% strain were then noted. The average values of 5 specimens are reported directly without normalization to the unit area. These values therefore characterize the stretchable laminate.

IP4 STRETCH AND RECOVERY

The stretch and recovery of the stretchable laminates of this invention were determined as per the IP4 method at a specified load using an Instron tensile testing machine.

Three separate 3"×8" specimens were die cut from the sample laminate in both the machine and the transverse direction. Samples were allowed to condition in a controlled room at a temperature of 21° C. and 65% relative humidity.

The Instron machine is equipped with a 3"'1" jaw on the bottom grip and a C-hook type jaw on the top grip. The sample with the 8" side aligned with the test direction is looped around the C-hook and both its ends are clamped on the 3"×1" jaw while maintaining a gauge length of 3 inches. The sample is then elongated at a speed of 5 inches/min. until the force reaches a preselected load. The sample is then brought to its relaxed state by returning the top grip to its original gauge length. This cycle is repeated two more times. During the third elongation, the amount of stretch to reach the preselected force is recorded. Then, the recovery is obtained from the specimen length, l, at which the force first becomes zero.

$$\% \text{ Recovery} = (2-l3) \times 100$$

Tests were done with a preselected load of 4 lbs. and 12 lbs., and the data are designated by the suffixes IP4 (4 lbs.) and IP4 (12 lbs.).

LIQUID WATER LEAKAGE

Articles made from the stretchable laminates were tested to determine whether materials and the articles produced from these materials would be an effective barrier. An effective barrier is defined as the ability of a material to prevent the passage of liquid water under the conditions of this test.

400 ml. of water was carefully poured into the article through the open portion of the article. The article was held in an inverted position so to contain the water throughout the duration of the test. The outside surface and the seam of the article were observed for one minute or until the presence of water leakage was observed.

If any water leakage from the article was observed, the article would receive a fail rating. If no water leakage from the article was observed during the one minute test period the article would receive a pass rating.

AUTOMATIC HOME LAUNDERING

The stretchable laminates were tested to assess their suitability for use in automatic home laundering. MTCC Method 135-1987 was used for this test. The result is reported as the number of wash-dry cycles before the sample loses its waterproofness as determined by the Waterproofness Test described below.

WATERPROOFNESS TEST

Samples of materials are tested for waterproofness by using a modified Suter test method, which is a low water-entry-pressure challenge. The test consists essentially of forcing water against one side of a test piece, and observing the other side of the test piece for indications of water penetration through it.

The sample to be tested is clamped and sealed between rubber gaskets in a fixture that holds the test piece inclined from the horizontal. The outer surface of the test piece faces upward and is open to the atmosphere, and to close observation. Air is removed from inside the fixture and pressure is applied to the inside surface of the test piece, over an area of 7.62 cm (3.0 inches) diameter, as water is forced against it. The water pressure on the test piece is increased to 6.8 kPa (1.0 psi) by a pump connected to a water reservoir, as indicated by an appropriate gauge and regulated by an in-line valve.

The outer surface of the test piece is watched closely for the appearance of any water forced through the material. Water seen on the surface is interpreted as a leak. A sample achieves a passing grade when, after 3 minutes, no water is visible on the surface. Passing this test is the definition of "waterproof" as used herein.

The following examples illustrate embodiments of the invention, but are not intended to limit the scope of the present invention.

EXAMPLE 1

This example demonstrates a two step method to produce the stretchable laminate of this invention. In the first step, a composite layer, designated as A, was produced. This is layer 5 in FIG. 1. The two hydrophobic polymer layers of the composite layer A were microporous membrane of expanded polytetrafluoroethylene obtained from W. L. Gore & Associates, Inc., Elkton, Md.

The microporous membrane was tested prior to assembly of the composite layer and the results of those tests are found in Table 1, column 1.

The composite layer A was prepared by the process shown in FIG. 6 and as generally taught by teachings of U.S. Pat. No. 5,026,591 to Henn et.al. The continuous water vapor permeable polymer layer employed was a polyoxyethylene polyether polyurethane made according to the teachings of U.S. Pat. No. 4,532,316 to Henn. A roll/coater having a 4-roll stack configuration was used. The stack consisted of a gravure roll with a pattern of 110 pyramidal cells per linear inch and a cell depth of 112 micrometers nipped at 272 psi against a low durometer silicone rubber-surfaced roll (surface hardness—Shore A 60 durometer), nipped at 442 psi against a chrome-surfaced metal roll, nipped at 590 psi against a silicone rubber-surfaced roll (surface hardness—Shore A 60 durometer). The gravure roll was heated to 105°–110° C. The chrome roll was heated to 105° C.–110° C. The rubber rolls were at a temperature of about 85° to 90° C. The gravure roll was in contact with a trough containing the polyurethane in a molten state. The polyurethane was transferred from the gravure roll along the stack until it came in contact with the microporous polytetrafluoroethylene membrane. The polyurethane was coated on and partially forced into the microporous polytetrafluoroethylene membrane and formed a continuous non-porous coating on the polytetrafluoroethylene membrane. A second microporous polytetrafluoroethylene membrane was adhered to the coated side by the non-porous continuous film of polyurethane thus forming composite layer A having two porous outer surfaces and a continuous non-porous interior. The microporous polytetrafluoroethylene membranes were joined with minimal back tension while the materials were being fed through the 4-roll stack at a speed of about 100 ft/min.

The composite layer was allowed to moisture cure for about 48 hours prior to testing and the test results of the composite layer A can be found in column 2 of Table 1.

In the second step, the composite layer A was adhesively laminated to an elastic fabric 1. The elastic fabric I was a 1.8 oz/yd² 80/20 Nylon/Lycra™ knitted fabric (Style 3320 from Warshow & Sons). The elastic fabric I was also tested prior to lamination and the test results are found in Table 1, column 3. The adhesive used was a one-component heat-curable polyurethane composition as described in U.S. Pat. No. 5,209,969 to Crowther.

The stretchable fabric laminate Z was prepared by a lamination process as shown in FIG. 7 using a conventional, direct gravure printer. A dot pattern of adhesive was metered onto one of the microporous surfaces of the composite layer A by a gravure roll in such a manner as to provide coverage of approximately 33% of the microporous surface and an adhesive laydown of about 5–8 gm/m$^2$. The gravure roll was heated to 50° C. The composite layer A was held under minimal tension against the gravure roll by a low durometer rubber roller at 69.4 psi pressure to print the adhesive dots onto the microporous polytetrafluoroethylene membrane surface. The printed surface of the composite layer was then bonded to an elastic fabric layer which had been stretched in the machine direction to reduce the width to about 70% of the width of the fabric in the relaxed state. The laminate was then wrapped around a 6 inch chrome roll heated at 180° C. to cure the heat-curable polyurethane adhesive while maintaining the microporous polytetrafluoroethylene surface of the laminate in contact with the chrome roll. About 65% of the hot chrome roll surface was covered by the laminate which was held under tension against the hot chrome roll and moved at 10 ft/min through the nip created by a low durometer rubber roll at ambient temperature being pressed against the chrome roll at 69.4 psi pressure. As soon as the laminate exited the nip the laminate was allowed to cool in the relaxed state in an accumulator prior to taking it up.

The above stretchable laminate Z has one fabric surface and one microporous surface and the test results of this laminate can be found in column 4 of Table 1. In addition, the laminate Z was found to be waterproof after 77 automatic home laundering cycles.

COMPARATIVE EXAMPLE 1

Comparative Example 1 demonstrates the effectiveness of the lamination procedure of this invention. A stretchable laminate was prepared by laminating elastic fabric I to the composite layer A. The procedure used was the same as the lamination procedure described in Example 1 with the exception that after exiting the hot nip the laminate was not allowed to relax and was taken up on the take-up roll 28 under tension, The properties of this laminate are compared to that of the stretchable laminate Z in Table 2. The comparative laminate shows inferior stretch properties in the machine direction.

EXAMPLE 2

This example prepares a stretchable fabric of this invention having two elastic fabric layers that were produced by adhesively bonding another layer of the elastic fabric I to the other microporous surface of composite layer A of the stretchable laminate Z. The lamination procedure and materials are the same as in Example 1 except that the adhesive was printed on the microporous surface of the stretchable laminate Z which was stretched in the machine direction to ensure that the microporous surface was substantially flat, and that the elastic fabric layer of the stretchable laminate Z of Example 1 was in contact with the hot chrome roll. The results of the stretchable laminate of this example are found in Table 3. The laminate retained its waterproofness over 105 cycles of automatic home laundering.

EXAMPLE 3

A stretchable laminate with two elastic fabric layers was made by adhesively bonding another layer of elastic fabric I to the microporous side of the stretchable laminate Z using a dot pattern of a moisture curing, hot melt polyurethane adhesive. The adhesive used and the lamination procedure followed were similar to that described in Examples 1 and 6 of U.S. Pat. No. 4,532,316 to Henn with the exception that the adhesive is printed on the microporous surface of the stretchable laminate Z stretched in the machine direction to ensure that the microporous surface of the stretchable laminate Z was substantially flat and it was bonded to a layer of elastic fabric I also stretched in the machine direction as in Example 1. The laminate was then taken up under adequate tension to maintain the laminate in a stretched state while the adhesive cured by reaction with ambient moisture. The results of the stretchable laminate of this example are found in Table 3.

EXAMPLE 4

An composite layer B was prepared as described for preparation of Layer A in Example 1 except that a gravure roll having a pattern of 35 cells per inch and a cell depth of 206 micrometers was used. The properties of the composite layer B are found in Table 4.

A stretchable laminate Y was prepared by laminating a layer of elastic fabric I to the composite layer B using the lamination procedure described in Example 1. The properties of this laminate are found in Table 4. The laminate retained its waterproofness for at least 100 cycles of automatic home laundering.

COMPARATIVE EXAMPLE 2

Comparative Example 2 characterizes a fabric laminate made with the same composite layer and elastic fabric layer as described in Example 4, but was assembled as per the teachings of U.S. Pat. No. 5,026,591 to Henn. The composite layer B was bonded to elastic fabric layer l by coating and partially penetrating one of the porous layers of the composite layer B with a continuous water vapor permeable polyurethane polymer layer which also served as the adhesive that bonds composite layer B to the elastic fabric. In Table 4, the properties of this laminate are compared with that of the stretchable laminate Y of this invention described in Example 4. The comparative laminate shows inferior stretch properties in both the machine and transverse direction and shows that non-continuous adhesive is needed.

EXAMPLE 5

A stretchable laminate X was prepared by laminating an elastic fabric II (3.2 oz/yd$^2$, 80/20 Nylon/Lycra™ knitted fabric, style 3271 from Warshow & Sons) to the composite layer B using the method described in Example 1. The properties of the elastic fabric ll as well as that of laminate X are found in Table 5. The laminate retained its waterproofness for at least 80 cycles of automatic home laundering.

EXAMPLE 6

A stretchable laminate was prepared by laminating another layer of elastic fabric I to the other microporous polytetrafluoroethylene surface of composite layer B of laminate Y using the procedure described in Example 2. The properties of this laminate are provided in Table 5. The laminate retained its waterproofness for at least 100 cycles of automatic home laundering.

EXAMPLE 7

A stretchable laminate was prepared by laminating a layer of elastic fabric I to the other microporous surface of the composite layer B of laminate X using the procedure described in Example 2. The properties of this laminate are

19 listed in Table 5. The laminate retained its waterproofness for at least 80 cycles of automatic home laundering.

EXAMPLE 8

This example demonstrates the method to modify an existing porous polymer membrane and its use to make the stretchable laminate of this invention. A microporous expanded polytetrafluoroethylene membrane prepared according to the teachings of U.S. Pat. No. 3,953,566 to Gore was used and its properties are listed in Table 6. Using a two-roll arrangement with the takeup moving at a faster rotational speed than the payoff, a 32 inch web of the microporous membrane was stretched in the machine direction to reduce the width of the web to 16 inches. The properties of the stretched microporous membrane are listed in Table 6, column 2.

Two lengths of the stretched microporous membrane were used to make the composite layer C using the procedure described in Example 1, except that the roll/coater stack consisted of a gravure roll with a pattern of 85 quadrangular cells per linear inch and a cell depth of 110 micrometers nipped at 69.4 psi against a silicone rubber-surfaced roll (surface hardness—Shore A 60 durometer), nipped at 69.4 psi against a chrome-surfaced metal roll, nipped at 69.4 psi against a low durometer silicone rubber-surfaced roll (surface hardness—Shore A 60 durometer). As in Example 1, the gravure roll was heated to 105°–110° C., the chrome roll was heated to 105° C.–110° C., and the rubber rolls were at a temperature of about 85° to 90° C. The gravure roll was in contact with a trough containing the polyurethane in a molten state. The polyurethane was transferred from the gravure roll along the stack until it came in contact with the microporous polymeric membrane. The polyurethane was coated on and partially forced into the microporous polymer membrane. The coated microporous polytetrafluoroethylene membrane was combined with a second microporous polytetrafluoroethylene membrane to form the composite layer A. The two layers of the microporous membranes were joined with minimal back tension while the materials were being fed through the 4-roll stack at a speed of about 10 ft/min.

The composite layer was allowed to moisture cure for about 48 hours prior to testing and the test results of the composite layer C can be found in column 3 of Table 6.

Using the lamination procedure described in Example 1, the composite layer C was then laminated to elastic fabric layer l to produce the stretchable laminate V of this invention. The properties of the stretchable laminate V are found in Table 6, column 4.

EXAMPLE 9

A stretchable laminate with two elastic fabric layers was produced by laminating another layer of the elastic fabric I to the exposed microporous layer of the stretchable laminate V using the procedure described in Example 2. The properties of the stretchable laminate are provided in Table 7, column 1.

EXAMPLE 10

This example demonstrates a stretchable laminate of the invention using two elastic fabrics with substantially different stretch characteristics. In this case, an elastic fabric ll (7.8 oz/yd$^2$, 93/7 polyester/Spandex, style 5418 knitted fabric from Milliken Co.) was laminated to the exposed microporous surface of stretchable laminate V using the procedure described in Example 2. The properties of the elastic fabric lll as well as that of the stretchable laminate are respectively provided in columns 2 and 3 of Table 7.

EXAMPLE 11

Example 11 describes a sock manufactured from the stretchable laminate of Example 10. Two layers of the laminates were positioned such that the heavier weight elastic fabric lll of the two laminates are adjacent to one another. Both the layers were then cut into a sock pattern designed to fit a foot of sizes 8½–10 (U.S. shoe sizes). The two layers in the shape of a sock are stitched together while keeping the elastic fabric layers llll adjacent to one another and keeping the ankle portion open. The stitched seam is then made waterproof by heat sealing a ⅞ inch wide seam-sealing tape (GORETEX® Seam-Seal Tape, available from W. L. Gore & Associates, Inc., Elkton, Md.) consisting of a 6 mil (150 micrometers) thick layer of thermoplastic adhesive adhered to a waterproof fabric laminate. The adhesive was in contact with the lighter weight elastic fabric 1. The sock was then turned inside out to have the elastic fabric layer lIll on the outside. Finally, an elastic cuff is stitched to the open ankle area to make the sock in its final form.

The sock could be donned and doffed easily by a person with a shoe size of U.S. 9½. When worm, the sock provided a snug, comfortable fit to the person's foot.

The sock produced from this process was subjected to the liquid water leakage test, to determine the integrity of the stretchable fabric laminate and the sealed seams. The sock received a pass rating.

TABLE 1

|  | Microporous Membrane, Example 1 | Composite Layer A | Elastic Fabric I | Laminate Z Example 1 |
| --- | --- | --- | --- | --- |
| Weight, g/m$^2$ | 3.55 | 17.86 | 56.2 | 87.19 |
| WVTR, g/m2/24 hrs | 88,605 | 23,746 | 41,209 | 18,277 |
| Gurley No., secs. | 2.7 | impermeable | — | — |
| Mullen Burst Press., psi | 58 | 158 | — | 178 |
| Machine Direction |  |  |  |  |
| % Stretch, IP4 - 4 lb | — | 7 | 157 | 46 |
| % Recovery | — | 98 | 96 | 98 |
| % Stretch, IP4 - 12 lb | — | 25 | 236 | 86 |
| % Recovery | — | 95 | 92 | 94 |
| 10% Stretch Force, lbs | 0.192 | 0.79 | 0.038 | 0.05 |

TABLE 1-continued

|  | Microporous Membrane, Example 1 | Composite Layer A | Elastic Fabric I | Laminate Z Example 1 |
|---|---|---|---|---|
| 25% Stretch Force, lbs | 0.712 | 2.138 | 0.114 | 0.13 |
| 50% Stretch Force, lbs | — | Break | 0.244 | 0.449 |
| Maximum Load, lbs | 1.14 | 2.55 | 10.72 | 13.05 |
| Elongation at Break, % | 52.7 | 78 | 408 | 327 |
| Transverse Direction |  |  |  |  |
| % Stretch, IP4 - (4 lbs) | — | 164 | 26 | 24 |
| % Recovery | — | 88 | 99 | 98 |
| % Stretch, IP4 - (12 lbs) | — | Break | 46 | 81 |
| % Recovery | — | — | 97 | 82 |
| 10% Stretch Force, lbs | 0.036 | 0.095 | 0.305 | 0.186 |
| 25% Stretch Force, lbs | 0.121 | 0.232 | 1.151 | 0.600 |
| 50% Stretch Force, lbs | 0.257 | 0.403 | 3.388 | 1.512 |
| Maximum Load, lbs | 0.606 | 1.272 | 20.95 | 20.59 |
| Elongation at Break, % | 170 | 294 | 168 | 309 |

TABLE 2

|  | Laminate Z, Example 1 | Comparative Example 1 |
|---|---|---|
| Weight, gm$^2$ | 87.19 | 85.25 |
| WVTR, g/m2/24 hrs | 18,277 | 18,121 |
| Mullen Burst Press., psi | 178 | 178 |
| Machine Direction |  |  |
| % Stretch, IP4 - 4 lb | 24 | — |
| % Recovery | 98 | — |
| % Stretch, IP4 - 12 lb | 81 | 53 |
| % Recovery | 82 | 53 |
| 10% Stretch Force, lbs | 0.050 | 0.137 |
| 25% Stretch Force, lbs | 0.136 | 0.469 |
| 50% Stretch Force, lbs | 0.449 | 2.649 |
| Maximum Load, lbs | 13.05 | 24.88 |
| Elongation at Break, % | 327 | 361 |
| Transverse Direction |  |  |
| % Stretch, IP4 - (4 lbs) | 24 | — |
| % Recovery | 98 | — |
| % Stretch, IP4 - (12 lbs) | 81 | 53 |
| % Recovery | 82 | 89 |
| 10% Stretch Force, lbs | 0.188 | 0.528 |
| 25% Stretch Force, lbs | 0.6 | 1.953 |
| 50% Stretch Force, lbs | 1.512 | 4.89 |
| Maximum Load, lbs | 20.59 | 29.19 |
| Elongation at Break, % | 309 | 213 |

TABLE 3

|  | Example 2 | Example 3 |
|---|---|---|
| Weight, g/m$^2$ | 159.8 | 173.1 |
| WVTR, g/m2/24 hrs | 10,774 | 9,738 |
| Mullen Burst Press., psi | 181 | 180 |
| Machine Direction |  |  |
| % Stretch, IP4 - 4 lb | 49 | 48 |
| % Recovery | 98 | 99 |
| % Stretch, IP4 - 12 lb | 68 | 69 |
| % Recovery | 96 | 98 |
| 10% Stretch Force, lbs | 0.092 | 0.177 |
| 25% Stretch Force, lbs | 0.236 | 0.371 |
| 50% Stretch Force, lbs | 0.882 | 0.889 |
| Maximum Load, lbs | 29.29 | 31.77 |
| Elongation at Break, % | 361 | 404 |
| Transverse Direction |  |  |
| % Stretch, IP4 - (4 lbs) | 15 | 20 |
| % Recovery | 98 | 99 |
| % Stretch, IP4 - (12 lbs) | 42 | 49 |
| % Recovery | 93 | 89 |
| 10% Stretch Force, lbs | 0.357 | 0.347 |
| 25% Stretch Force, lbs | 1.26 | 1.007 |
| 50% Stretch Force, lbs | 2.898 | 2.555 |
| Maximum Load, lbs | 29.80 | 35.92 |
| Elongation at Break, % | 295 | 320 |

TABLE 4

|  | Microporous Membrane Example 4 | Composite Layer B | Laminate Y Example 4 | Comparative Example 2 |
|---|---|---|---|---|
| Weight, g/m² | 3.55 | 39.72 | 117.22 | 113.3 |
| WVTR, g/m2/24 hrs | 88,605 | 18,992 | 13,528 | 9,618 |
| Gurley No., secs | 2.7 | impermeable | — | — |
| Mullen Burst Press., psi | 58 | 157 | 180 | 182 |
| Machine Direction | | | | |
| % Stretch, IP4 - 4 lb | — | 6 | 52 | 6 |
| % Recovery | — | 99 | 96 | 99 |
| % Stretch, IP4 - 12 lb | — | 18 | 68 | 11 |
| % Recovery | — | 98 | 96 | 99 |
| 10% Stretch Force, lbs | 0.192 | 1.821 | 0.089 | 2.05 |
| 25% Stretch Force, lbs | 0.712 | 3.228 | 0.210 | 3.99 |
| 50% Stretch Force, lbs | — | 3.031 | 1.14 | 4.04 |
| Maximum Load, lbs | 1.14 | 2.579* | 18.29 | 15.8 |
| Elongation at Break, % | 53 | 237 | 291 | 388 |
| Transverse Direction | | | | |
| % Stretch, IP4 - (4 lbs) | — | 69 | 29 | 9 |
| % Recovery | — | 95 | 98 | 99 |
| % Stretch, IP4 - (12 lbs) | — | Break | 76 | 27 |
| % Recovery | — | — | 87 | 99 |
| 10% Stretch Force, lbs | 0.036 | 0.241 | 0.32 | 0.81 |
| 25% Stretch Force, lbs | 0.121 | 0.476 | 0.86 | 2.20 |
| 50% Stretch Force, lbs | 0.257 | 0.703 | 1.167 | 4.20 |
| Maximum Load, lbs | 0.606 | 2.309 | 19.37 | 24.7 |
| Elongation at Break, % | 170 | 486 | 294 | 215 |

*-Load at Break, lbs

TABLE 5

|  | Elastic Fabric II | Laminate X Example 5 | Example 6 | Example 7 |
|---|---|---|---|---|
| Weight, g/m² | 109.7 | 190.8 | 181.16 | 242.20 |
| WVTR, g/m2/24 hrs | 27,600 | 13,157 | 7,869 | 6,792 |
| Mullen Burst Press., psi | — | — | — | — |
| Machine Direction | | | | |
| % Stretch, IP4 - 4 lb | 101 | 60 | 46 | 47 |
| % Recovery | 95 | 97 | 98 | 98 |
| % Stretch, IP4 - 12 lb | 185 | 81 | 74 | 80 |
| % Recovery | 94 | 96 | 96 | 96 |
| 10% Stretch Force, lbs | 0.07 | 0.119 | 0.117 | 0.145 |
| 25% Stretch Force, lbs | 0.18 | 0.255 | 0.314 | 0.351 |
| 50% Stretch Force, lbs | 0.39 | 0.738 | 0.987 | 0.854 |
| Maximum Load, lbs | 24.1 | 33.0 | 31.85 | 34.89 |
| Elongation at Break, % | 371 | 348 | 374 | 367 |
| Transverse Direction | | | | |
| % Stretch, IP4 - (4 lbs) | 32 | 25 | 17 | 14 |
| % Recovery | 98 | 98 | 98 | 98 |
| % Stretch, IP4 - (12 lbs) | 66 | 85 | 55 | 42 |
| % Recovery | 97 | 92 | 93 | 96 |
| 10% Stretch Force, lbs | 0.15 | 0.343 | 0.484 | 0.576 |
| 25% Stretch Force, lbs | 0.60 | 0.851 | 1.31 | 1.464 |
| 50% Stretch Force, lbs | 1.42 | 1.68 | 2.682 | 3.113 |
| Maximum Load, lbs | 37.8 | 27.7 | 34.77 | 12.34 |
| Elongation at Break, % | 300 | 369 | 294 | 265 |

TABLE 6

|  | Microporous Membrane, Example 8 | Microporous Membrane, Example 8, Stretched | Composite Layer C | Laminate V Example 8 |
|---|---|---|---|---|
| Weight, g/m² | 12.6 | 14.5 | 48.4 | 142.7 |
| WVTR, g/m2/24 hrs | 71,739 | 67,139 | 19,245 | 13,749 |
| Gurley No., secs. | 7.6 | 14.2 | impermeable | — |
| Mullen Burst Press., psi | 115 | 118 | 172 | 178 |

TABLE 6-continued

| | Microporous Membrane, Example 8 | Microporous Membrane, Example 8, Stretched | Composite Layer C | Laminate V Example 8 |
|---|---|---|---|---|
| Machine Direction | | | | |
| % Stretch, IP4 - 4 lb | — | — | 5.5 | 59 |
| % Recovery | — | — | 99 | 98 |
| % Stretch, IP4 - 12 lb | — | — | 12 | 81 |
| % Recovery | — | — | 97 | 93 |
| 10% Stretch Force, lbs | 0.122 | 0.357 | 1.04 | 0.126 |
| 25% Stretch Force, lbs | 0.522 | 1.258 | 1.77 | 0.286 |
| 50% Stretch Force, lbs | 0.875 | 1.78 | 2.55 | 0.906 |
| Maximum Load, lbs | 1.929 | 2.643 | 3.37 | 32.59 |
| Elongation at Break, % | 161 | 102 | 2.09 | 277.8 |
| Transverse Direction | | | | |
| % Stretch, IP4 - (4 lbs) | — | — | 67 | 27 |
| % Recovery | — | — | 95 | 98 |
| % Stretch, IP4 - (12 lbs) | — | — | 141 | 62 |
| % Recovery | — | — | 88 | 91 |
| 10% Stretch Force, lbs | 0.17 | 0.05 | 0.10 | 0.256 |
| 25% Stretch Force, lbs | 0.896 | 0.104 | 0.2 | 0.793 |
| 50% Stretch Force, lbs | 1.806 | 0.243 | 0.35 | 1.853 |
| Maximum Load, lbs | 2.726 | 1.915 | 1.62 | 17.33 |
| Elongation at Break, % | 81 | 182 | 300 | 418 |

TABLE 7

| | Example 9 | Elastic Fabric III | Example 10 |
|---|---|---|---|
| Weight, g/m$^2$ | 191.4 | 248.0 | 363.3 |
| WVTR, g/m2/24 hrs | 7,875 | 16,247 | 5,584 |
| Mullen Burst Press., psi | 182 | — | 218 |
| Machine Direction | | | |
| % Stretch, IP4 - 4 lb | 42 | 50 | 36 |
| % Recovery | 97 | 96 | 99 |
| % Stretch, IP4 - 12 lb | 63 | 95 | 62 |
| % Recovery | 95 | 95 | 97 |
| 10% Stretch Force, lbs | 0.215 | 0.059 | 0.284 |
| 25% Stretch Force, lbs | 0.470 | 0.177 | 0.594 |
| 50% Stretch Force, lbs | 1.305 | 0.505 | 1.693 |
| Maximum Load, lbs | 41.9 | 47.94 | 34.56 |
| Elongation at Break, % | 301.4 | 258 | 218.5 |
| Transverse direction | | | |
| % Stretch, IP4 - (4 lbs) | 16 | 136 | 20 |
| % Recovery | 99 | 91 | 100 |
| % Stretch, IP4 - (12 lbs) | 39 | 175 | 51 |
| % Recovery | 95 | 85 | 93 |
| 10% Stretch Force, lbs | 0.654 | 0.043 | 0.662 |
| 25% Stretch Force, lbs | 0.116 | 0.116 | 1.469 |
| 50% Stretch Force, lbs | 3.304 | 0.276 | 2.602 |
| Maximum Load, lbs | 15.52 | 20.04 | 29.1 |
| Elongation at Break, % | 307 | 400 | 428 |

We claim:

1. A process for making a stretchable layered fabric laminate stretchable in both the machine and transverse directions comprising the steps of:

(a) forming a composite of two microporous polymeric outer layers capable of elongating at least 50% of the original length in a transverse direction;

said layers joined by an intermediate layer of a non-porous water-vapor-permeable polymer partially impregnated into the micropores of the polymeric layers;

(b) stretching an elastic fabric in the machine direction so as to reduce its width to a width of 90 percent or less of its initial relaxed width, said fabric having elastic properties in at least the machine direction;

(c) maintaining said fabric in the stretched state while adhesively laminating said composite to said stretched fabric with a non-continuous pattern of adhesive, (d) reducing the force stretching said fabric, thereby allowing said fabric to elastically retract to a relaxed state whereby in the machine direction said composite layer is bunched and folded as said fabric elastically recovers from being stretched.

2. The process for making a stretchable layered fabric laminate as recited in claim 1 wherein the microporous polymeric layers are microporous polytetrafluoroethylene.

3. The process for making a stretchable layered fabric laminate as recited in claim 1 wherein the non-porous water-vapor-permeable polymer is poly(oxyethylene) polyurethane.

* * * * *